(12) United States Patent
Roudiere et al.

(10) Patent No.: US 12,313,764 B2
(45) Date of Patent: May 27, 2025

(54) SYSTEM AND METHOD FOR RADAR INTERFERENCE MITIGATION USING CLUSTERING

(71) Applicant: NXP B.V., Eindhoven (NL)

(72) Inventors: Sylvain Roudiere, Toulouse (FR); Vincent Pierre Martinez, Venerque (FR); Didier Salle, Toulouse (FR)

(73) Assignee: NXP B.V., Eindhoven (NL)

( * ) Notice: Subject to any disclaimer, the term of this patent is extended or adjusted under 35 U.S.C. 154(b) by 353 days.

(21) Appl. No.: 17/749,201

(22) Filed: May 20, 2022

(65) Prior Publication Data

US 2023/0023302 A1 Jan. 26, 2023

(30) Foreign Application Priority Data

Jul. 20, 2021 (EP) .................................... 21306020

(51) Int. Cl.
*G01S 7/02* (2006.01)
*G01S 13/931* (2020.01)

(52) U.S. Cl.
CPC ............ *G01S 7/023* (2013.01); *G01S 13/931* (2013.01)

(58) Field of Classification Search
CPC ............................... G01S 7/023; G01S 13/931
See application file for complete search history.

(56) References Cited

U.S. PATENT DOCUMENTS

| 5,497,162 | A | 3/1996 | Kaiser, III |
| 7,187,321 | B2 | 3/2007 | Watanabe et al. |
| 9,952,312 | B2 | 4/2018 | Corbett |
| 2003/0102997 | A1 | 6/2003 | Levin et al. |
| 2007/0120731 | A1 | 5/2007 | Kelly et al. |

(Continued)

FOREIGN PATENT DOCUMENTS

| DE | 102016101183 A1 | 8/2016 |
| DE | 102017216435 A1 | 3/2019 |

(Continued)

OTHER PUBLICATIONS

Khoury et al., "RadarMAC: Mitigating Radar Interference in Self-Driving Cars," 2016 13th Annual IEEE International Conference on Sensing, Communication, and Networking (SECON) (2016), pp. 1-9.

(Continued)

*Primary Examiner* — Bernarr E Gregory
*Assistant Examiner* — Hailey R Le

(57) ABSTRACT

A mechanism is provided to reduce interference between vehicular radar systems through communicating radar parameters and physical orientation between vehicles and then using directional information to form clusters of radars, which will have consistent modulation parameters. Radar modulation parameters, such as starting frequency, center frequency, bandwidth, slope, ramp direction, timing, and the like for frequency-modulated continuous-wave (FMCW) radars, are adjusted to reduce or eliminate inter-cluster direct interference between clusters oriented in different directions. For other types of radars, in some embodiments, other operational parameters can be adjusted. In some embodiments, some modulation parameters also can be adjusted to reduce or eliminate intra-cluster indirect interference.

20 Claims, 9 Drawing Sheets

(56) References Cited

U.S. PATENT DOCUMENTS

| | | | |
|---|---|---|---|
| 2010/0283666 A1* | 11/2010 | Lee | G01S 3/74 342/175 |
| 2011/0260908 A1 | 10/2011 | New et al. | |
| 2011/0291875 A1 | 12/2011 | Szajnowski | |
| 2016/0061935 A1 | 3/2016 | McCloskey et al. | |
| 2017/0153324 A1* | 6/2017 | Lomnitz | H04B 17/12 |
| 2017/0219689 A1 | 8/2017 | Hung et al. | |
| 2020/0307542 A1* | 10/2020 | Engstrom | F16H 61/0213 |
| 2021/0063566 A1 | 3/2021 | Smith et al. | |
| 2021/0156960 A1* | 5/2021 | Popov | G01S 13/89 |
| 2021/0208242 A1* | 7/2021 | Sudarsan | G01S 13/42 |
| 2021/0357281 A1* | 11/2021 | Malboubi | G06F 16/285 |
| 2022/0326374 A1* | 10/2022 | Torres | G01S 7/0232 |
| 2022/0413129 A1* | 12/2022 | Fan | G01S 7/0231 |

FOREIGN PATENT DOCUMENTS

| | | |
|---|---|---|
| DE | 102018124688 A1 | 4/2020 |
| EP | 1821118 A1 | 8/2007 |
| EP | 1826586 A1 | 8/2007 |
| EP | 3757597 A1 | 12/2020 |
| JP | H06160512 A | 6/1994 |

OTHER PUBLICATIONS

Aydogdu et al., "RadChat: Spectrum Sharing for Automotive Radar Interference Mitigation," IEEE Transactions on Intelligent Transportation Systems, 22(1) (2021), pp. 416-429.

Aydogdu et al., "Radar Communications for Combating Mutual Interference of FMCW Radars," 2019 IEEE Radar Conference (RadarConf) (2019), pp. 1-6.

Aydogdu et al., "Radar Interference Mitigation for Automated Driving: Exploring Proactive Strategies," in IEEE Signal Processing Magazine (Jul. 2020), vol. 37, No. 4, pp. 72-84.

Radartutorial.Eu, "Radar Tutorial—The Radar Equation," Downloaded from the internet at https://www.radartutorial.eu/01.basics/L%27Equation%20du%20Radar.fr.html, May 12, 2022, 4 pages.

Al-Hourani et al, "Stochastic Geometry Methods for Modelling Automotive Radar Interference," IEEE Transactions on Intelligent Transportation Systems ( vol. 19, Issue: 2, Feb. 2018), 12 pages.

Terbas et al., "Radar to Radar Interference in Common Traffic Scenarios," Proceedings of the 16th European Radar Conference, Oct. 2-4, 2019, 4 pages.

Liu et al., "Cognitive Radar Using Reinforcement Learning in Automotive Applications," available at https://www.scribd.com/document/520013230/1904-10739v1, Apr. 24, 2019, 11 pages.

\* cited by examiner

SYSTEM AND METHOD FOR RADAR INTERFERENCE MITIGATION USING CLUSTERING

CROSS-REFERENCE TO RELATED APPLICATIONS

This application claims the priority under 35 U.S.C. § 119 of European Patent application no. 21306020.5, filed on 20 Jul. 2021, the contents of which are incorporated by reference herein.

BACKGROUND

Field

This disclosure relates generally to vehicular radar systems, and more specifically, to mitigation of radar interference by clustering radars having similar field-of-view directions.

Related Art

Radar systems are used to detect the range, velocity, and angle of targets. With advances in technology, radar systems can now be applied in many different applications, such as automotive radar safety systems, but not every radar system is suitable for every application. For example, 77 GHz Frequency Modulation Continuous Wave (FMCW) Fast Chirp Modulation (FCM) radars are used with multiple-input, multiple-output (MIMO) arrays as sensors in Advanced Driver Assistance System (ADAS) and autonomous driving (AD) systems.

Automotive radar sensors provide information regarding a vehicle's environment. The environmental information is relative to the radar's mounting position and orientation and is determined by detecting a reflected radio frequency (RF) signal transmitted by the radar transceiver. Reflected RF signals are weaker than the originally transmitted signal, and thus RF noise in the vicinity of the radar transceiver can obscure reflected signals thereby reducing the effectiveness of the radar.

Mutual interference between radars is a growing problem. Studies illustrating radar market penetration show that by 2030 over 50% of all vehicles on the road will be equipped with radars. This represents about 700 million vehicles having 3.5 billion radar devices. There is no regulation or standardization for the use of available signal band or waveform to be used. The lack of standardization, combined with exponential growth of advanced driver-assistance systems (ADAS) and autonomous driving systems, will lead to increased risks of life-threatening consequence due to radar interference. Therefore, radar interference mitigation is becoming increasingly important.

BRIEF DESCRIPTION OF THE DRAWINGS

Embodiments of the present invention may be better understood by referencing the accompanying drawings.

The use of the same reference symbols in different drawings indicates identical items unless otherwise noted. The figures are not necessarily drawn to scale.

DETAILED DESCRIPTION

Figure 1:
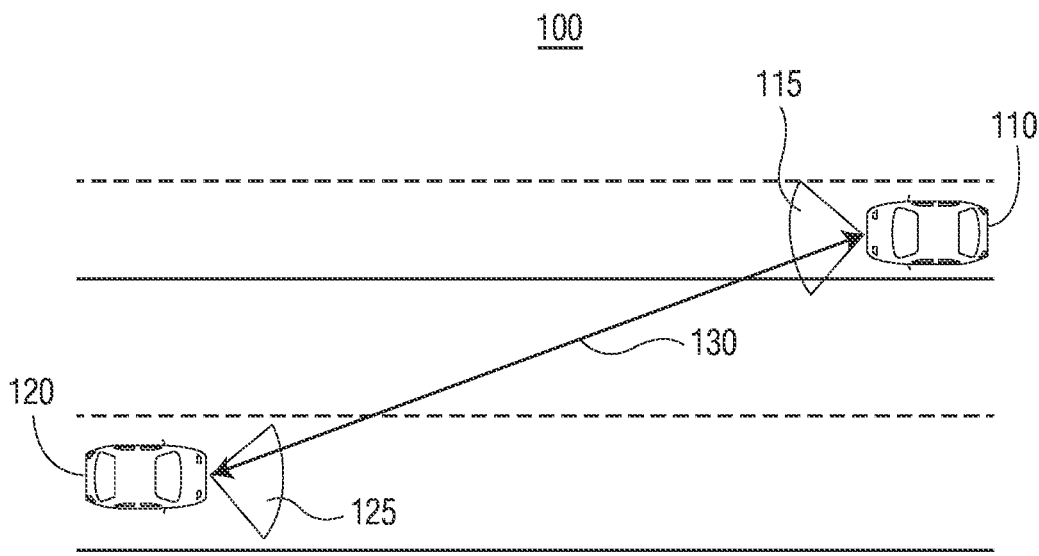
FIG. 1 is a simplified block diagram illustrating a direct interference scenario.

Embodiments of the present invention reduce interference between vehicular radar systems through communicating radar parameters and physical orientation between vehicles and then using directional information to form clusters of radars, which will have consistent modulation parameters. Radar modulation parameters, such as starting frequency, center frequency, bandwidth, slope, ramp direction, timing, and the like for frequency-modulated continuous-wave (FMCW) radars, are adjusted to reduce or eliminate inter-cluster direct interference between clusters oriented in different directions. For other types of radars, in some embodiments, other operational parameters can be adjusted. In some embodiments, some modulation parameters also can be adjusted to reduce or eliminate intra-cluster indirect interference.

Radar systems operate by transmitting a signal, which is then reflected by an object or target in the environment. The radar system receiving the reflected signal compares the properties of the reflected signal to the transmitted signal. A radar system can estimate the range and velocity of an object in the environment, and some radar systems (e.g., multiple input, multiple output or MIMO systems) can also estimate the angle of the object from the direction of the radar transmitter. Radars can determine different target angles, such as azimuth and elevation, depending on the antenna scanning or number and geometry of antenna-receiver channels.

Radar systems are designed for different performance objectives. Generally, with a fixed number of antennas, a radar with a broad field-of-view (FOV) can be obtained at the expense of less angular resolution, while a narrow FOV can provide better angular resolution. Antenna configuration can determine estimated target direction in the horizontal and vertical planes. Performance of a radar system depends on the bandwidth of the signal, the time duration over which estimation is performed, and the geometry of the transmitter and receiver antennas.

Automotive radar systems have the potential for mutual interference due to multiple radars operating simultaneously in close proximity and direct line of sight. The rapid increase in the number of vehicles equipped with single or multiple radar systems, in order to provide full 360-degree situational awareness, will significantly increase the probability of mutual interference. Mutual interference effects can be substantial unless suitable mitigation is employed.

Direct interference, which is also known as $1/R^2$ interference, results from signals originating from a transmitting radar that are within the FOV of a victim radar and which are received by the victim radar receiver. These signals may have a higher power than reflected echo signals from targets and therefore may adversely affect the ability of the victim radar to discern echo signals. Possible effects of this interference are: (1) saturation of the receiver, (2) appearance of a ghost target in the case of synchronous interference, and (3) a decrease in detection performance and even a complete loss of target discernment owing to an increase in noise associated with the interference level at the analysis point.

FIG. 1 is a simplified block diagram illustrating a direct interference scenario. Two vehicles are approaching one another from opposite sides of road 100. Vehicle 110 is traveling from right to left in the figure, while vehicle 120 is traveling from left to right in the figure. Both vehicles have a front-facing radar as illustrated by transmission patterns 115 and 125, respectively. The two radars (e.g., radar transmitter and radar receiver) are directly facing one another and in each other's FOV, as illustrated by transmission line 130. This scenario can result in a direct interference between the two vehicles' radars.

This direct interference is problematic since the power received by a victim radar from the interferer radar follows the following equation:

$$P_{received} = \frac{P_{transmitted} * G}{4 * \pi * R^2} * A_\omega \quad \text{(equation 1)}$$

where:
$P_{received}$ is the power of the interference received by the victim
$P_{transmitted}$ is the power of the signal transmitted by the interferer
G is the antenna gain
$A_\omega$ is the effective antenna aperture of the victim's radar
R is the distance between the two radars In this scenario, the power of the interferer's signal decreases with the square of the distance ($1/R^2$) separating the two radars. This creates a very powerful interference compared to an indirect interference scenario, as described below, which is a $1/R^4$ interference.

Figure 2:
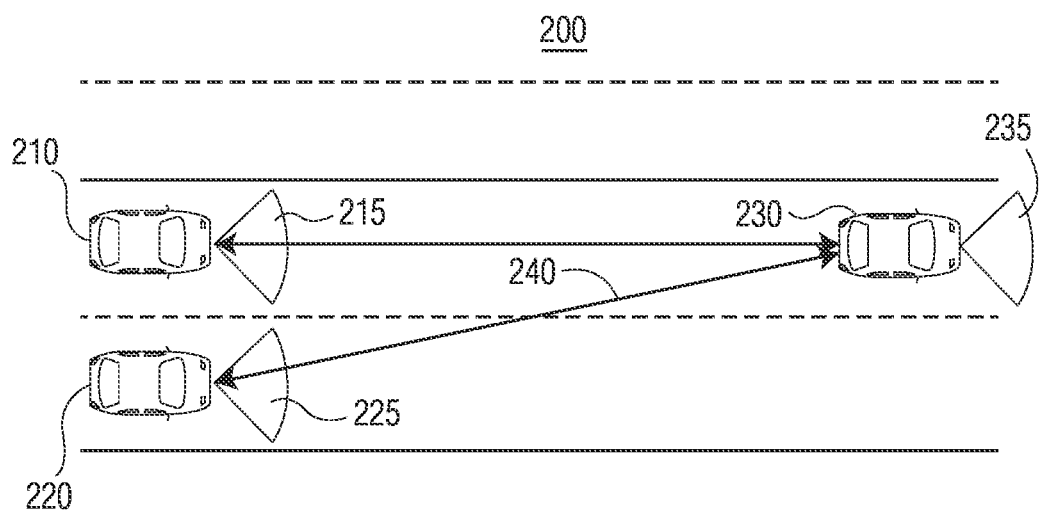
FIG. 2 is a simplified block diagram illustrating an indirect interference scenario.

FIG. 2 is a simplified block diagram illustrating an indirect interference scenario. Three vehicles are traveling on the same side of road 200 and each of vehicles 210, 220, and 230 are traveling from left to right in the figure. Vehicles 210 and 220 are traveling near one another in neighboring lanes. Vehicle 230 is traveling ahead of vehicles 210 and 220, in the same lane as vehicle 210. Each vehicle has a forward-facing radar, as illustrated by transmission patterns 215, 225, and 235. While none of the radar transmitters are in the field-of-view of another vehicle's receiver, a reflection of a radar signal from one of vehicles 210 or 220 can be received by the radar of the other vehicle. This type of indirect interference as illustrated by transmission line 240.

In the indirect interference scenario, the power received by the victim follows the equation:

$$P_{received} = \frac{P_{transmitted} * G * \sigma}{(4*\pi)^2 * R^4} * A_\omega \quad \text{(equation 2)}$$

where:
σ is the radar cross section
$P_{received}$ is the power of the interference received by the victim
$P_{transmitted}$ is the power of the signal transmitted by the interferer
G is the antenna gain
$A_\omega$ is the effective antenna aperture of the victim's radar
R is the distance between the two radars In this scenario, the power received by the victim is diminishing by a power of 4 with the distance between the two radars. This could lead to an interference not being powerful enough to blind the victim's radar compared to the first "$1/R^2$" situation. But false or ghost signals can result if the transmission parameters of the two radars in vehicles 210 and 220 are similar.

Figure 3:
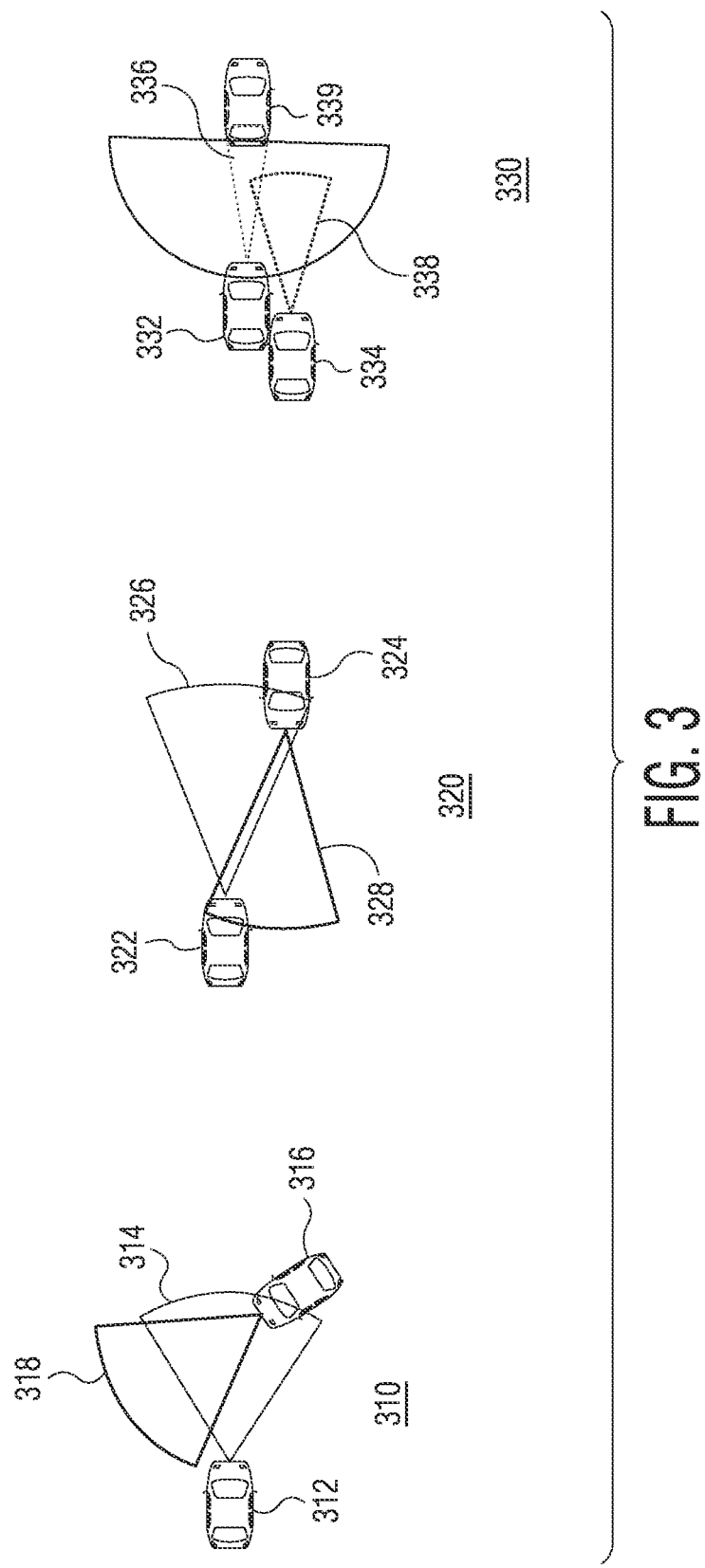
FIG. 3 is a simplified block diagram illustrating scenarios in which interference may or may not be occurring between two radars.

FIG. 3 is a simplified block diagram illustrating scenarios in which interference may or may not be occurring between two front-facing radar systems. It should be noted that for two radars to interfere directly with one another, the radar antennas need to be both in the line of sight of each other. For example, in scenario 310, vehicle 316 is in line of sight of vehicle 312, as illustrated by transmission pattern 314 of vehicle 312. But vehicle 312 is not in line of sight of the radar of vehicle 316, as illustrated by transmission pattern 318 of vehicle 316. Thus, for scenario 310 there is no interference.

In scenario 320, on the other hand, both vehicles 322 and 324 are in line of sight of one another, as illustrated by transmission patterns 326 and 328, respectively. In this scenario, therefore, there is possible direct interference between the radars of the two vehicles.

Finally, in scenario 330, vehicles 332 and 334 are traveling in a same direction, and not in one another's line of sight, as illustrated by transmission patterns 336 and 338, respectively. But a reflection from vehicle 339 of a radar transmission from vehicle 334, for example, can be in the line of sight of the radar of vehicle 332. In this scenario, there is possible indirect interference between the radars of vehicles 332 and 334.

Embodiments of the present invention utilize the above concepts to reduce the amount of direct interference between vehicles travelling in each other's field of view (e.g., travelling in opposite directions on the same road). Parameters of radars in different vehicles are adjusted in real time to sufficiently differentiate the radar signals such that interfering signals generated by other radar systems does not obscure echoes of signals generated by a radar. Embodiments perform this adjustment of parameters by providing radar parameters for vehicles in the vicinity of one another. Communication of the radar parameters can be performed using a secured communication channel that can also be omni-directional, broadcasting, and in current use. Such a communication channel can include, for example, a V2X network such as that described below. Other types of secured communication channels can also be used to provide this information between vehicles embodying the present invention.

Depending on the manner of controlling the radar signals (e.g., a "chirp" signal generated by a FMCW radar system), any of the main modulation parameters can be used to implement embodiments of the present invention. These modulation parameters can include, for example, starting frequency, center frequency, end frequency, modulation bandwidth, modulation slope, chirp timings such as chirp period, dwell time between chirps, and the like as associated with FMCW radars. While the below discussion focuses on starting frequency of a FMCW chirp signal as the modulation parameter, embodiments are not limited to modulating starting frequency.

Embodiments utilize a direction-based clustering concept that relates to the above idea that radar system antennas oriented in the same direction will not directly interfere with one another, and in the absence of reflections will not indirectly interfere (e.g., FIG. 2). Therefore, radar systems having antennas pointing in the same direction can share a high degree of parameter commonality, which includes having a similar center frequency (Q. Embodiments further automatically group radars within the direction-based clusters, without explicitly defining in advance how modulation parameters such as center frequency are selected.

Figure 4:
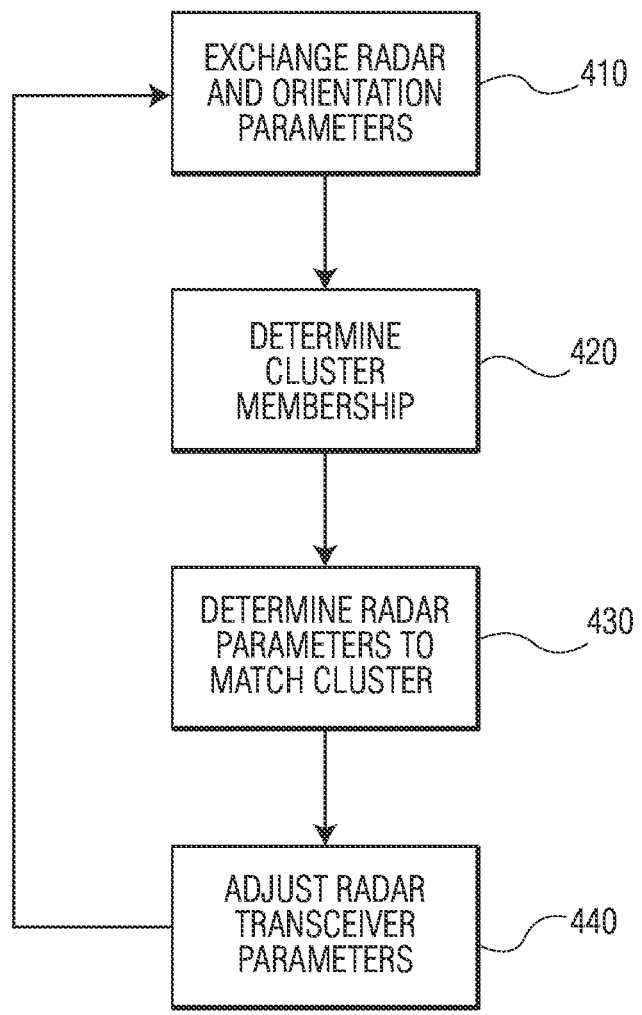
FIG. 4 is a simplified flow diagram illustrating an example of steps performed to reduce or negate radar interference in accordance with embodiments of the present invention.

FIG. 4 is a simplified flow diagram illustrating an example of steps performed to reduce or negate radar interference in accordance with embodiments of the present invention. Each of these steps will be discussed in greater detail below. As an initial step, a vehicle will exchange radar and radar antenna orientation parameters with vehicles in the vicinity (410). A "vicinity" can change in light of a particular scenario. For example, a vicinity for vehicles traveling on a multilane highway may be several hundred meters, depending upon the limits of the range of radars employed on the vehicles. As another example, a vicinity for vehicles traveling on tight city streets may be less than 100 m, due to a number of obstacles and density of vehicles in the vicinity.

After radar modulation and orientation parameters have been exchanged, a processor in the vehicle can form clusters of radar systems associated with the other vehicles in the vicinity and determine to which clusters each radar system on the vehicle should belong (420). As will be discussed below, cluster formation can be determined based upon the orientation of the radar antennas (e.g., aperture direction). The vehicle processor can then determine the cluster to which each radar on the vehicle should join by finding a cluster having the closest matching orientation to each of the radars.

Once cluster membership has been determined, then a determination can be made as to the radar modulation parameters associated with that cluster (430). Typically, a cluster will have a single primary radar modulation parameter associated with the cluster (e.g., center frequency, starting frequency, end frequency, modulation bandwidth, modulation slope, chirp timings such as chirp period, dwell time between chirps, and the like for FMCW radar). Once the cluster's radar parameters have been determined, the vehicle's radar transceiver parameters can be adjusted to match a mean value of the cluster's primary radar parameter (440).

Embodiments of the present invention begin the process of adjusting radar parameters by exchanging parameters and orientation between vehicles in a vicinity (e.g., 410). The radar parameters can be transmitted using a side communication channel available to the vehicles. One example of such a side communication channel can be realized with a Vehicle to Everything network (V2X), which defines a concept of creating an ad hoc network between vehicles and other infrastructure in a vicinity of the vehicles, using one channel of the 5.9 GHz ITS (Intelligent Transport System) band. Such a network can be achieved using different access layer technologies, such as, for example, ITS-G5 based on IEEE 802.11p, or C-V2X based on sidelink LTE-V2X or sidelink 5G NR V2X. Such networks allow the communication of standardized messages, such as Cooperative Awareness Messages (CAM) and Basic Safety Messages (BSM) according to the ETSI ITS standard. Another example of such a side communication channel can be a cellular 4G or 5G network.

CAM is a basic safety type of message exchange by nodes in the ETSI ITS application. Format and emission rules for CAM are standardized under ETSI TS 102 637-2, for example. Generation of CAM messages follow a specific algorithm that considers speed of the vehicle, change in direction (or heading), and acceleration. Each of the parameters can cause generation of a CAM if the parameter reaches a certain threshold. One example of such thresholds are as follows: [speed] change in position of more than 4 m, [heading] change of direction of more than 4°, and [acceleration] change of speed larger than 0.5 m/s.

Figure 5:
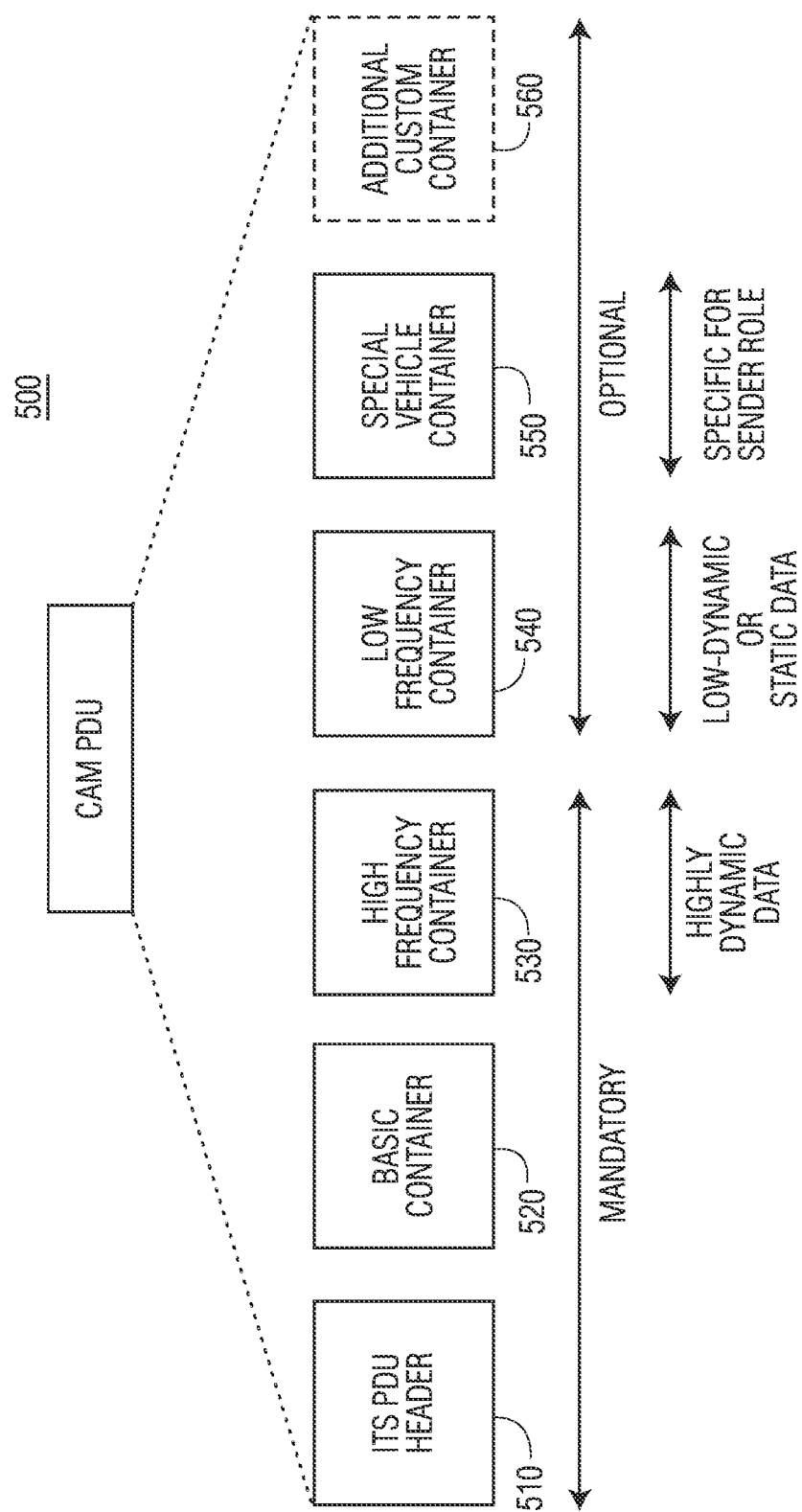
FIG. 5 is a simplified block diagram illustrating parts of a CAM packet data unit (PDU) 500, usable by embodiments the present invention.

FIG. 5 is a simplified block diagram illustrating parts of a CAM packet data unit (PDU) 500, usable by embodiments the present invention. CAM messages include multiple parts: (1) An Intelligent Transport System PDU header 510 that includes mandatory information such as a station identifier (e.g., a vehicle identifier); (2) a basic container 520 that provides information associated with the originating station, such as the type of originating station (e.g., a vehicle), and the latest geographic position of the originating station; (3) vehicle ITS station containers that include at least a high-frequency container 530 that contains all fast-changing status information of the vehicle station (e.g., heading or speed) and, optionally, a low frequency container 540 that contains static or slow-changing vehicle station data (e.g., status of exterior lights); and (4) a special vehicle container 550 that can include status information associated with vehicle stations having a specific role in road traffic (e.g., public transportation). Additional custom containers 560 can include optional information. For embodiments, the optional fields can be configured to hold essential radar parameters that could be exchanged via V2X.

Figure 6:
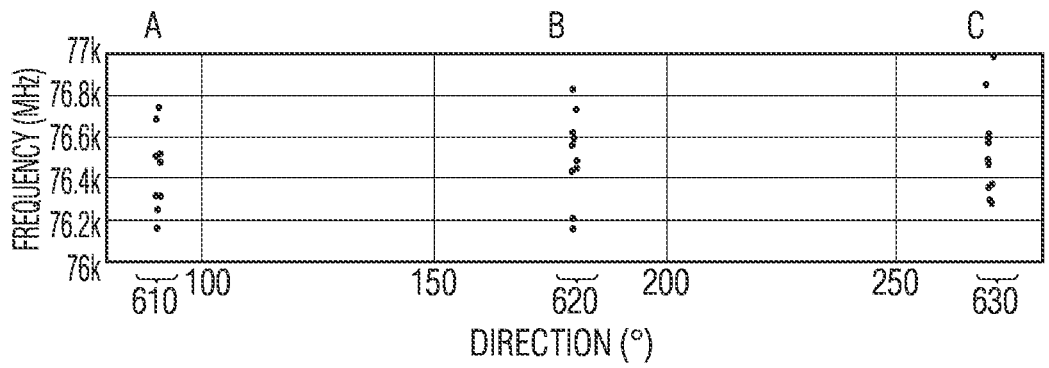
FIG. 6 is a chart illustrating frequency and direction data for a set of vehicle radars in a vicinity.

FIG. 6 is a chart illustrating frequency and direction data for a set of vehicle radar systems in a vicinity. In this example, center frequency (fc) of the radar signals (e.g., chirps for FMCW) is the selected modulation parameter for embodiments. At the stage of FIG. 6, prior to execution of an embodiment of the present invention, all center frequencies are random. The center frequencies, along with directional data, are transmitted to each other vehicle in the vicinity (e.g., via V2X signals). The illustration is of a scenario in which there are three roads, two of which are 180 degrees from each other (e.g., road A and road C) and one of which is 90 degrees from each of A and C (e.g., road B). Roads A and C can be, for example, different directions of the same road. Since vehicles on roads A and C are 180 degrees apart, radar systems from these vehicles can cause direct interference with one another. Additionally, a rearward facing radar on a vehicle on a road can directly interfere with forward facing radars on vehicles behind that radar, and vice versa.

Once a vehicle's system has gathered a list of neighbor radars' parameters and orientations, the system then uses clustering techniques to group radars by orientation. Clustering methods can either be hard coded (e.g., a cluster for 0° to 10°, 10° to 20°, etc.) or using a more complex algorithm such as K-nearest neighbor or Gaussian Mixture, for example. In some embodiments, a Gaussian Mixture algorithm is used to generate a predefined number of clusters (in one preferred embodiment, 12 clusters are implemented). Considering that in most situations there is no need for a large number of clusters, embodiments then regroup clusters that are close to one another resulting in two-to-four clusters in most scenarios. In FIG. 6, the clusters are defined by the direction of the vehicles on the roads along with the orientation of each radar system antenna on a vehicle. Thus, there is a cluster 610 of vehicles having a radar orientation at 90°, a cluster 620 at 180°, and a cluster 630 at 270°. Once clusters are well defined, then the system determines to which cluster the current radar system belongs and further determines which clusters are potentially harmful to the current radar system (e.g., belonging to a cluster that is about 180° in orientation from the present radar system's cluster, such as clusters 610 and 630).

Once a cluster membership has been decided, the system then determines the changes to apply to the radar's frequency, or other parameters. "Pulling" or "pushing" forces are computed for the cluster. A radar parameter will be attracted, or "pulled," by the average of its own cluster with a certain force and will also be "pushed" by settings of a harmful cluster.

Figure 7:
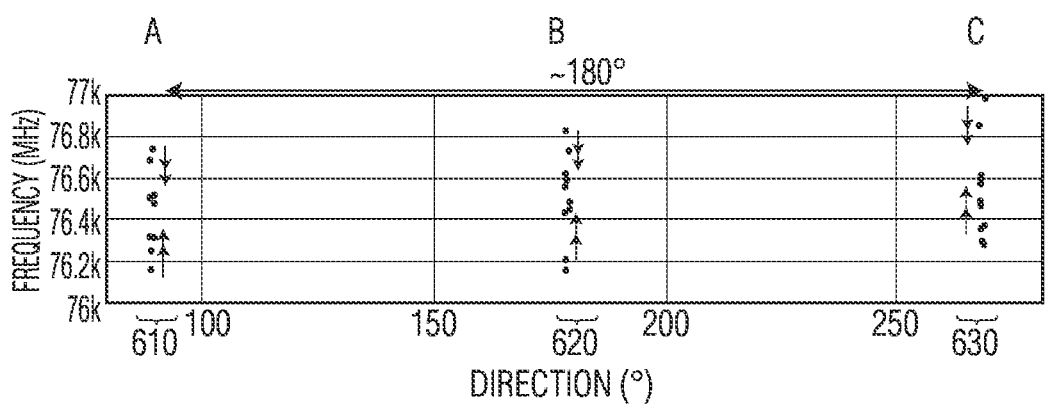
FIG. 7 is a chart illustrating frequency and direction data for the set of vehicle radars illustrated in FIG. 6 in which the cluster members are being pulled toward the average center frequency of the cluster members.

FIG. 7 is a chart illustrating frequency and direction data for the set of vehicle radar systems illustrated in FIG. 6 in which the cluster members are being pulled toward the average center frequency of the cluster members. The arrows associated with each cluster illustrate the calculation to adjust the center frequency of each cluster toward the average center frequency of that cluster. As mentioned above, the initial center frequency values are random. Therefore, it is likely that there will be little difference between the median values of the center frequencies between the three clusters in the scenario. But in a scenario in which clusters have already been formed on a set of roads, the center frequencies may already be divergent between each cluster in order to avoid interference, and therefore a new radar being added to a cluster will be drawn to the already decided median frequency.

Figure 8:
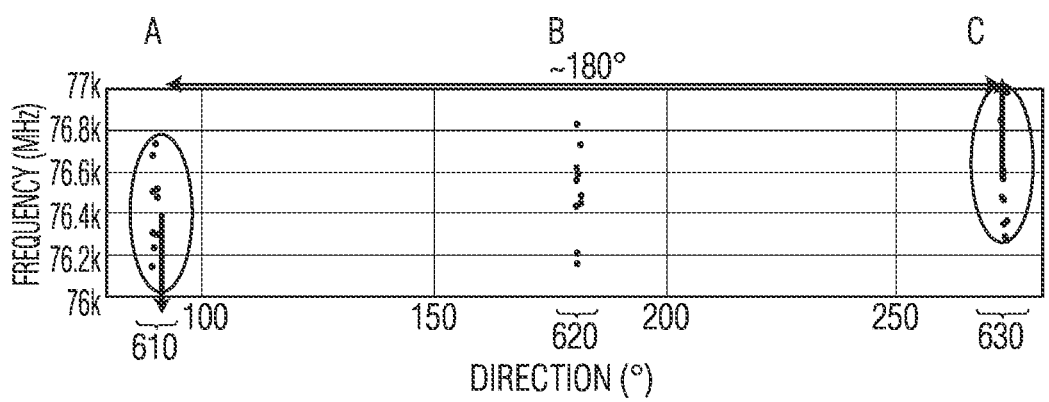
FIG. 8 is a chart illustrating frequency and direction data for the set of vehicle radars illustrated in FIGS. 6 and 7 in which the cluster members' median center frequencies are being pushed from potentially interfering cluster parameters.

FIG. 8 is a chart illustrating frequency and direction data for the set of vehicle radars illustrated in FIGS. 6 and 7 in which the cluster members' median center frequencies are being pushed from potentially interfering cluster parameters. A "push" force maximizes a difference between different clusters in the solution space for the vicinity of the vehicle. If this did not happen, then multiple clusters could overlap (i.e., the clusters would have similar parameters that could lead to interference). In FIG. 8, the two clusters that are 180° apart, cluster 610 and cluster 630, have median center frequency values being pushed away from one another (e.g., the median center frequency of cluster 610 is being decreased toward 76 GHz, while the median center frequency of cluster 630 is being increased toward 77 GHz). Depending on the desired application (e.g., long-range, medium-range, or short-range radar, or corner radar, and the like) and range resolution, a function for center frequency versus direction is adapted to that application. In addition, the frequency range can be adapted to the scenario (e.g., 76-77 GHz or 77-81 GHz bands).

With the center frequency being a parameter exchanged between vehicle radars, when the center frequency of a harmful cluster is sufficiently separate from a radar's center frequency, then the system will stop pushing frequencies apart. This will be discussed more fully below. A similar principle applies to the "pulling" forces; that is, when the radar frequency is sufficiently near the average of its own cluster, the system will stop pulling the frequencies together.

When the system determines an appropriate parameter for the subject vehicle radar system in order to be associated with the chosen cluster, then the system will adjust that parameter for the radar transceiver of the vehicle, thereby reducing the impact of interference upon the radar system. This process continues dynamically while the vehicle is driven in order to adjust to different clusters encountered due to directional and road changes.

Figure 9:
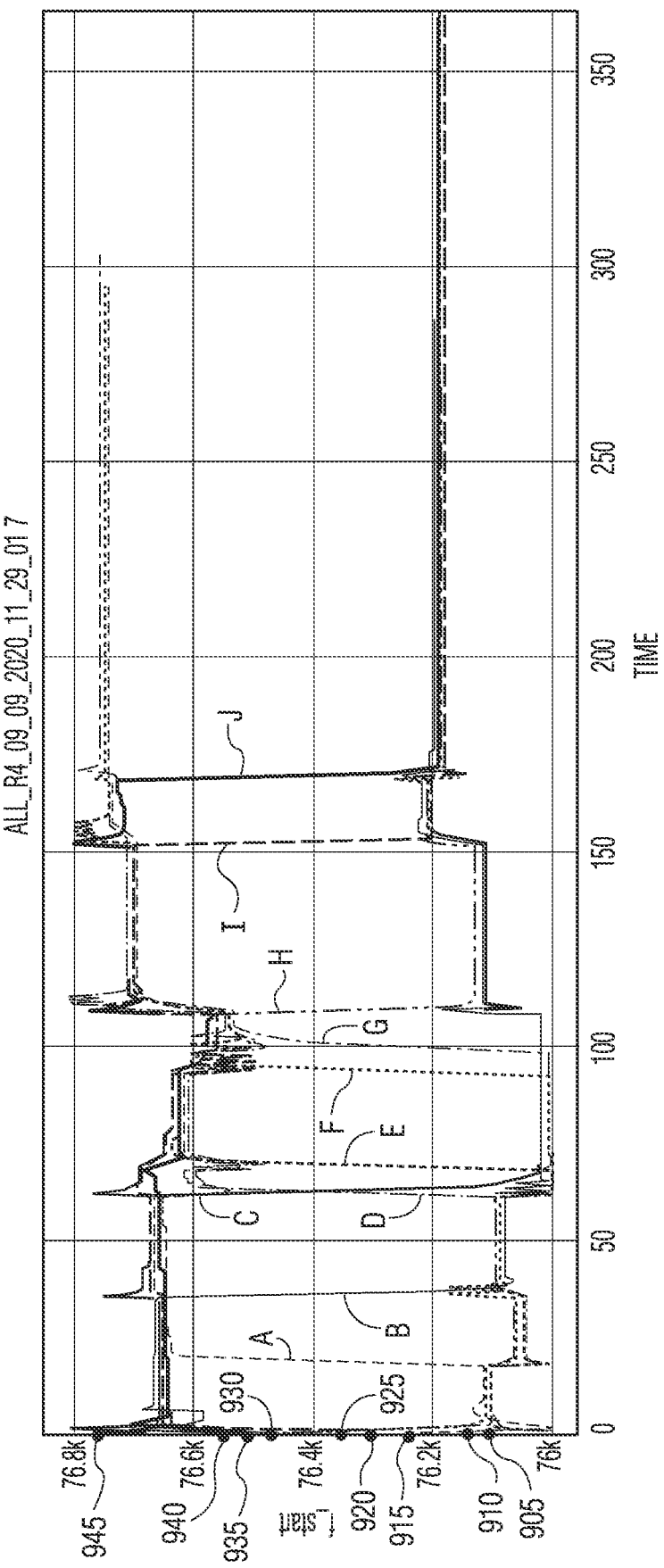
FIG. 9 is a chart illustrating simulation results of an embodiment of the present invention.

FIG. 9 is a chart illustrating simulation results of an embodiment of the present invention. The chart is of starting frequency of the chirps of a set of forward-facing radars 905-940 on a highway versus time. Vehicles 905, 910, 915, and 930 are traveling in a first direction (e.g., left to right on the highway), while vehicles 920, 925, 935, 940, and 945 are traveling in a second direction 180° to the first direction on the highway (e.g., right to left). The frequency of each radar system is different at an initial time 0. As the clustering process proceeds, the radar systems are clustered depending upon their direction and then the starting frequencies are pushed to values at about 76.1 GHz and 76.65 GHz within a few time cycles. As time progresses, the vehicles reach the "end" of the simulated road and make a U-turn at times A-J. As each vehicle makes the U-turn, the forward-facing radar joins the cluster associated with the new direction and the starting frequencies of not only the vehicle radar newly joining the cluster, but also the starting frequencies of each vehicle radar in the cluster adjust.

As illustrated, the gap in frequencies between the two clusters in FIG. 9 is about 0.55 GHz. This gap represents a frequency swipe of the radar signal of the radar units associated with the vehicles. The "pushing" force discussed above is biased toward this gap value, which is defined in the algorithm associated with the pushing. Once this gap is reached, the force pushing the radar starting frequency apart approaches zero. Clustering, in essence, divides up the radar band into multiple subchannels, each associated with a radar orientation. As illustrated in FIG. 8, there are three distinct subchannels, one each associated with the 90-, 180-, and 270-degree clusters.

While the above examples have illustrated clustering and adjusting of frequency as the associated primary parameter with the clusters, some embodiments can adjust different radar parameters to avoid direct interference between clusters. For example, inter-frame timing can be adjusted so that a first cluster will transmit a chirp in a first time period and a second cluster will transmit a chirp in a second time period that is disjoint with the first time period. Such transmission between disjoint time periods can continue in time. In such a scenario, processing of the radar results can proceed for the first cluster during the second time period, while processing of the radar results for the second cluster can be performed during the first time period. It should be noted that with exchange of radar parameters between vehicles in a vicinity, tight-frame synchronization between radar units can be performed. A V2X subsystem can help provide an accurate time reference to the radar modules to realize such schemes.

Figure 10:
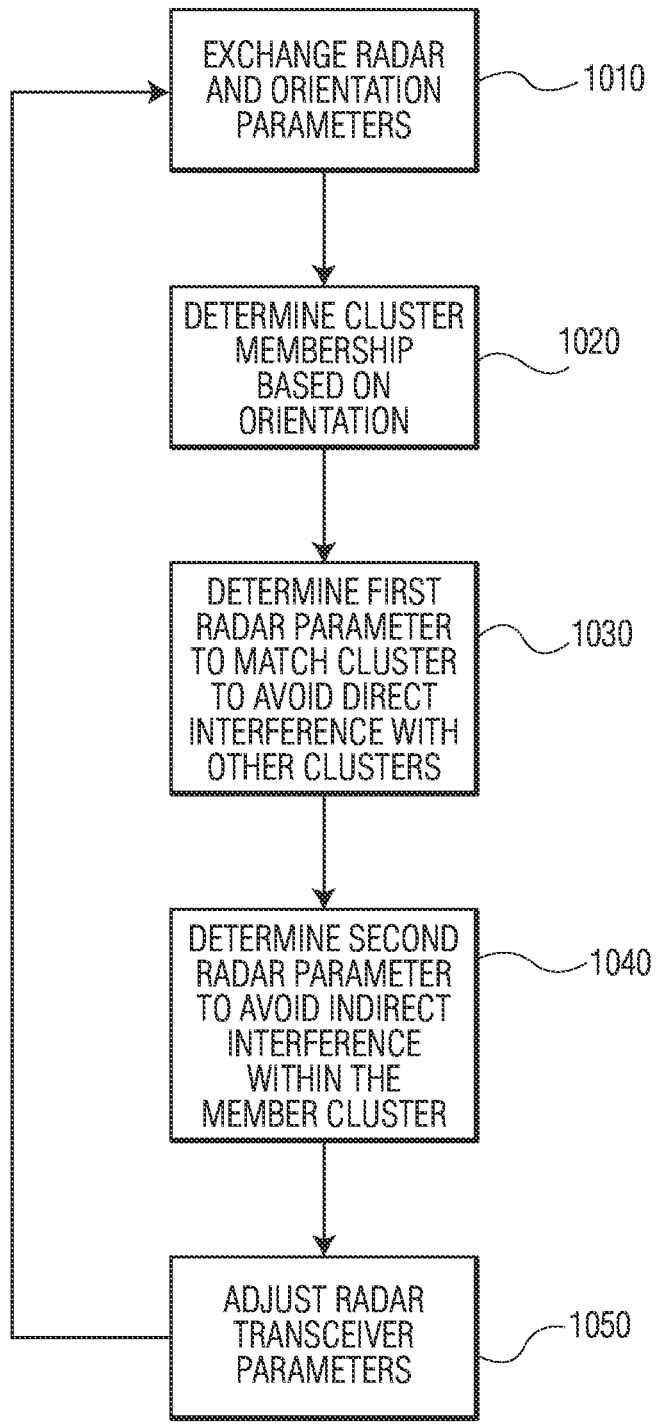
FIG. 10 is a simplified flow diagram illustrating an alternative example of steps performed to reduce or negate radar interference in accordance with some embodiments of the present invention.

FIG. 10 is a simplified flow diagram illustrating an alternative example of steps performed to reduce or negate radar interference in accordance with some embodiments of the present invention. As an initial step, a vehicle will exchange radar system parameter and radar antenna orientation information with vehicles in the vicinity (1010). As above, "vicinity" can change in light of a particular scenario.

After radar system and antenna orientation parameters have been exchanged, a processor on the vehicle can make a determination regarding the clusters of radar systems in the vicinity and to which cluster the radar system should belong (1020), using one of a variety of clustering techniques such as K-nearest neighbor or Gaussian Mixture based on the orientation of the radars in the vicinity and that of the present vehicle. The vehicle determines the cluster to which the radar system should join by finding a cluster having the closest matching general orientation to the radar system's own.

Once a cluster membership has been determined, then a first determination is made as to a first radar parameter associated with that cluster (1030). Typically, a cluster will have a single first radar parameter associated with the cluster (e.g., center frequency, starting frequency, end frequency, modulation bandwidth, modulation slope, chirp timings such as chirp period, dwell time between chirps, and the like). This first radar parameter is chosen to avoid direct interference with other clusters that have orientations that puts those other clusters in the field of view of the selected cluster.

In addition to selection of a first radar parameter, the system can then determine a second radar parameter to avoid indirect interference from members of the cluster of which the vehicle is a member (1040). The second radar parameter is not the same parameter as the first radar parameter. In this manner, the direct interference will continue to be avoided. The second parameter is pushed away from members of the cluster in order to avoid the indirect interference. In some embodiments, adjustment of the second radar parameter will only be performed when cluster membership exceeds a threshold in order to avoid unnecessary computation. Techniques for adjusting the second parameter include, for example, randomly changing the second parameter until interference mitigation reaches a threshold, scanning the radar frequency band to find the best frequency/time parameters, using V2X to estimate which parameters are less likely to provoke interference based on the knowledge of other radars, and the like.

Once the radar system parameters have been determined, the vehicle's radar system's first and second radar transceiver parameters can be adjusted in accord with the calculated parameters (1050). The process then repeats so that the radars can continuously adjust parameters in light of changing conditions in the vicinity and changing orientation of the vehicle.

Figure 11:
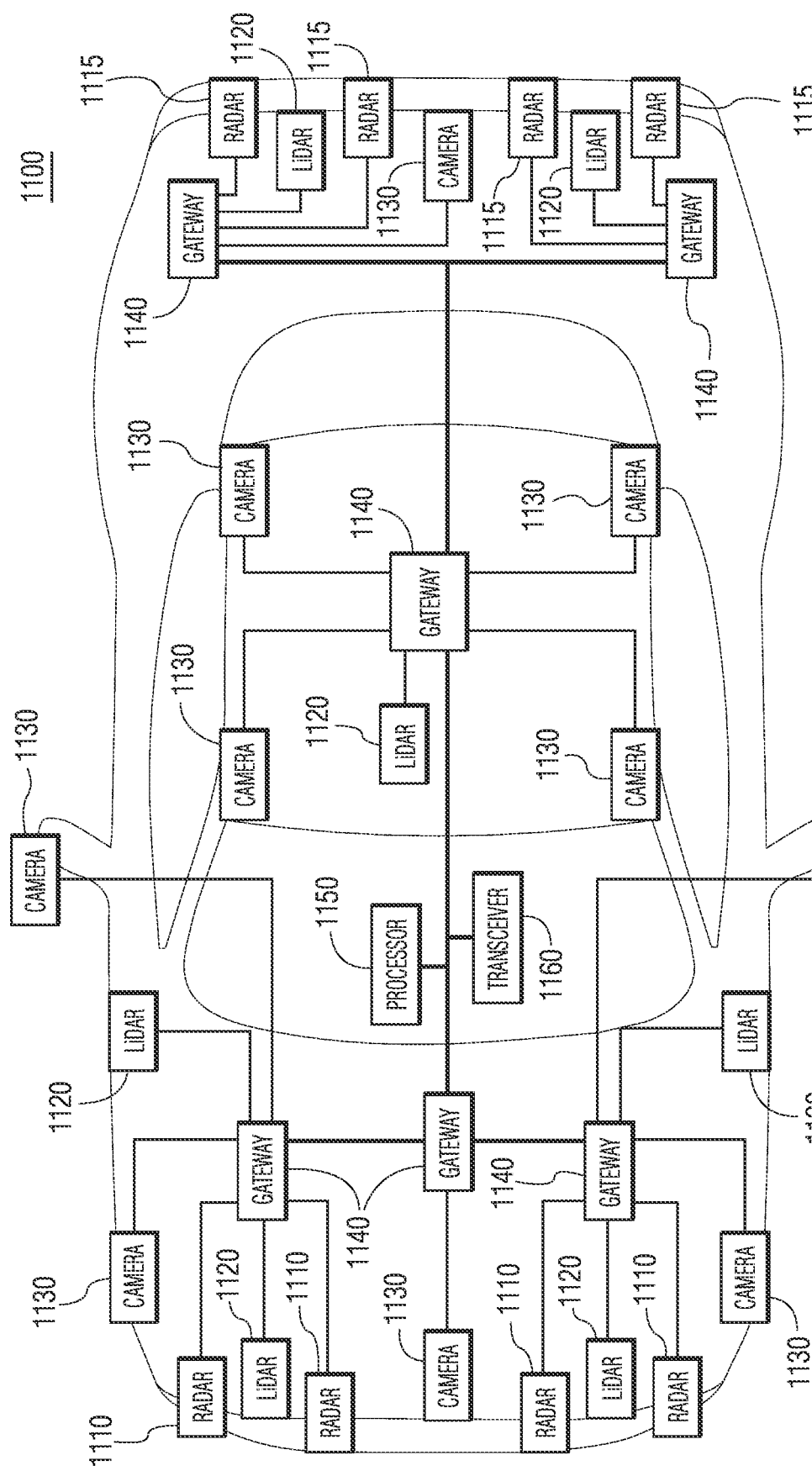
FIG. 11 is a simplified block diagram illustrating an example of a sensor network used in an automobile that includes numerous radar systems that can incorporate implementations of embodiments of the present invention.

FIG. 11 is a simplified block diagram illustrating an example of a sensor network used in an automobile 1100 that includes numerous radar systems that can incorporate implementations of embodiments of the present invention. In an autonomous driving system, for example, data from multiple different types of sensors is used to construct a 360° perception of the environment around the vehicle. Typical sensor types include radar, camera, LiDAR, ultrasound, and a GPS/inertial measurement unit. FIG. 11 illustrates a simplified example of distribution of such sensors throughout the vehicle.

Multiple radar sensors can be deployed along the front (e.g., front facing radars 1110) and rear (e.g., rear facing radars 1115) of vehicle 1100. As discussed above, the radar sensors send out radio waves that detect objects and gauge their distance, angle, and speed in relation to the vehicle in real time. Both short-and long-range radar sensors can be deployed around the car. Short range (24 GHz) radar applications can be used for blind spot monitoring, lane-keeping assistance, and parking aids. Long range (77 GHz) radar sensors include automatic distance control and break assistance. In addition, newer imaging radar sensors can map out surroundings in a three-dimensional point cloud in high resolution. Each point in the point cloud is augmented with sensory information such as radial velocity, radar cross section, and polarization. The long-range radar sensors are most subject to the interference effects discussed above, and are also the most likely to cause such interference.

LiDAR (light detection and ranging) sensors 1120 are similar to radar sensors but use laser light instead of radio waves for object detection. Vehicles also have video cameras and visual sensors 1130 used to capture images and interpret objects around the vehicle in a manner similar to how human drivers see with their eyes.

As illustrated in FIG. 11, the various sensors are placed around the vehicle and provide network connections to several gateway nodes 1140. The gateway nodes can be smart switches that gather the data from the various sensors and provide that information to a central processor 1150. Central processor 1150 can be configured to perform tasks associated with the interference mitigation system discussed herein, including the determination of cluster membership, calculation of radar parameters, providing the radar parameters to the various radar sensors 1110 and 1115, and performing communication exchanges with vehicles in the vicinity through a V2X transceiver 1160 to gather the radar parameters discussed above. Conversely, in some embodiments of the present invention the computational effort associated with clustering and parameter determination can be moved away from central processor 1150 and into the radar sensors 1110 and 1115 or computational capacity of gateway nodes 1140.

Figure 12:
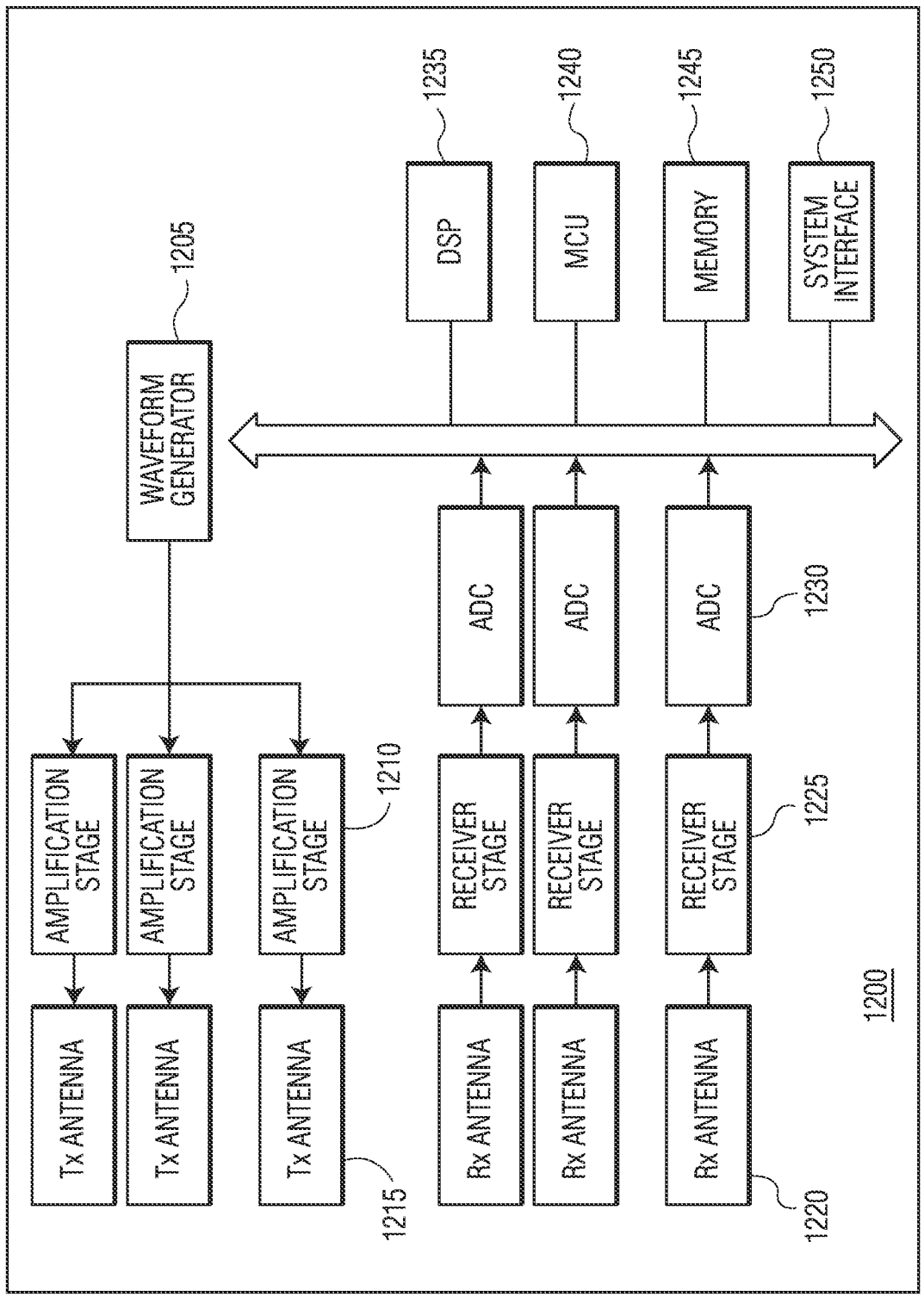
FIG. 12 is a simplified functional diagram illustrating one example of a radar system usable to implement embodiments of the present invention.

FIG. 12 is a simplified functional diagram illustrating one example of a radar system usable to implement embodiments of the present invention. Radar system 1200 includes a waveform generator 1205, and one or more amplification stages 1210 coupled to corresponding radar signal transmit antennas 1215. Radar system 1200 further includes one or more receive antennas 1220 coupled to corresponding receiver stages 1225, which are coupled to corresponding analog-to-digital converters (ADC) 1230. ADCs 1230 and waveform generator 1205 are coupled to a digital signal processor (DSP) 1235, a microcontroller unit (MCU) 1240, a memory 1245, and a system interface 1250.

In one embodiment, waveform generator 1205 is configured to generate a continuous wave signal with a frequency chirp. The amplification stages 1210 receive and amplify the frequency chirped continuous wave signal. The amplified signal is then radiated by a corresponding transmit antenna 1215 in order to detect objects in the vicinity of the radar system (e.g., a target object near vehicle 1000).

A reflected signal can be received at one or more of the receive antennas 1220. Receiver stages 1225 can then perform initial processing on the received reflected signal, including, for example, amplifying the received signal, mixing the amplified signal with a current transmit waveform generated by waveform generator 1205, and filtering the signal. The initially processed signal can then be provided to an ADC 1230 to be sampled and converted to a digital signal. DSP 1235 can process the received digital signals to produce various desired measurements of detected objects such as range, relative radial velocity, and angle of arrival, as discussed above. Memory 1245 is coupled to DSP 140 and MCU 1240 for use in processing the received digital signals. In one embodiment, memory 1245 can store information associated with the interference mitigation system discussed herein, including, for example, cluster parameters, current radar parameters, instructions for executing all or a portion of the interference mitigation system by DSP 1235. System interface 1250 provides an external interface that can be used to supply information to other systems and receive information from other systems, such as computed parameters from processor 1050 or received other radar parameters from transceiver 1060. Radar system 1200 can be implemented on a single integrated circuit or a combination of ICs.

By now it should be appreciated that there has been provided a method for reducing radar interference at a first radar installed on a first vehicle. The method includes: receiving, at an RF receiver of the first vehicle, from a plurality of vehicles including radar units and a vicinity of the vehicle, a radar parameter value associated with each radar unit and information associated with an orientation direction of each radar unit of each vehicle of the plurality of vehicles; determining, by a processor coupled to the RF receiver, a set of clusters associated with each radar unit of the plurality of vehicles, wherein each cluster is associated with the orientation direction of the radar units; associating, by the processor, the first radar with a first cluster of the set of radars, wherein the Association is determined in light of an orientation direction of the first radar; determining, by the processor, the radar parameter value for the first radar, wherein the determining the radar parameter value for the first radar includes determining a mean value of the radar parameter value for radars in the first cluster; and, adjusting the first radar to transmit a radar signal using the determined radar parameter value for the first radar.

In one aspect of the above embodiment, a radar parameter associated with the radar parameter value includes a parameter associated with a waveform generated by an associated radar unit.

In another aspect of the above embodiment, the first cluster includes a set of radars having an orientation direction a same orientation direction as the first radar, and a second cluster includes a set of radars having a second orientation direction substantially 180° from that of the first cluster. In a further aspect, determining the radar parameter value for the first radar further includes determining a second mean value of the radar parameter value associated with the second cluster, and adjusting the determined radar parameter value for the first radar to a value sufficient to avoid direct interference with radars associated with the second cluster.

In another aspect of the above embodiment, determining the set of clusters includes using one of a K-nearest neighbor or Gaussian Mixture algorithm to associate radar orientations for each cluster of the set of clusters. In yet another aspect of the above embodiment, determining the set of clusters includes using a range of orientation angles to associate radar orientations for each cluster of the set of clusters.

Another aspect of the above embodiment further includes transmitting, at an RF transmitter of the first vehicle, information associated with the determined radar parameter value of the first vehicle and the orientation direction of the first vehicle. A further aspect further includes performing the transmitting and receiving using a side communication network that includes the first vehicle and the plurality of vehicles.

There is further provided another embodiment having a first vehicle that includes an RF receiver configured to receive signals from a plurality of other vehicles, a radar system configured to transmit a radar signal in a field of view direction associated with a direction of travel the first vehicle, a processor coupled to the RF receiver and the radar system, and a memory coupled to the processor and storing instructions executable by the processor. The signals include a radar parameter value associated with radar units associated with each vehicle the plurality of other vehicles and information associated with an orientation direction of each radar of each vehicle of the plurality of other vehicles. The instructions are executable by the processor for: determining a set of clusters associated with each radar unit of the plurality of vehicles, where each cluster is associated with an orientation direction of the radar units; associating the radar system with a first cluster of the set of clusters, where the association is determined in response to an orientation direction of the radar system; determining the radar parameter value for the radar system, where determining the radar parameter value for the first radar includes determining a mean value of the radar parameter value for radars in the first cluster; and, adjusting the radar system to transmit the radar signal using the determined radar parameter value for the radar system.

In one aspect of the above embodiment, a radar parameter associated with the radar parameter value includes a parameter associated with a waveform generated by an associated radar unit. In another aspect, the first cluster includes a set of radars having an orientation direction in a same orientation direction as the radar system, and a second cluster includes a set of radars having a second orientation direction substantially 180° from that of the first cluster. In a further aspect, determining the radar parameter value for the radar system further includes determining a second mean value for the radar parameter value associated with the second cluster, and adjusting the determined radar parameter value for the radar system to a value sufficient to avoid direct interference with radars associated with the second cluster.

In another aspect, determining the set of clusters includes using one of a K-nearest neighbor or Gaussian Mixture algorithm to associate radar orientations for each cluster of the set of clusters. In another aspect, determining the set of clusters includes using a range of orientation angles to associate radar orientations for each cluster of the set of clusters.

Another aspect further includes an RF transmitter configured to transmit information associated with the determined radar parameter value of the first vehicle and the orientation direction of the first vehicle. In a further aspect, the RF transmitter and the RF receiver perform the transmitting and receiving using a side communication network that includes the first vehicle and the plurality of vehicles.

Another embodiment is provided that includes a radar system installed within a first vehicle. The radar system includes a transmit portion configured to transmit a radar signal in a field of view direction associated with a direction of travel of the first vehicle, a receive portion configured to receive RF signals where the RF signals include a reflection of the radar signal from a target, a network interface configured to communicate with a vehicle RF receiver configured to receive signals from a plurality of other vehicles, a processor coupled to the transmit portion, the receive portion, and the network interface, and a memory coupled to the processor and storing instructions executable by the processor. The signals from the plurality of other vehicles include a radar parameter value associated with a radar associated with each vehicle and information associated with a direction of travel for each vehicle. The network interface receives information associated with the radar parameter values associated with each vehicle and the information associated with the direction of travel of each vehicle. The instructions executable by the processor are for: determining a set of clusters associated with radar units of the plurality of vehicles, wherein each cluster is associated with an orientation direction of the radar units and the orientation direction is associated with a direction of travel of a vehicle associated with the radar unit; associating the radar system with a first cluster of the set of clusters wherein the Association is determined in response to an orientation direction of the radar system; determining the radar parameter value for the radar system wherein determining the radar parameter value for the radar system includes determining a mean value of the radar parameter value of radars in the first cluster; adjusting the transmit portion of the radar system to transmit the radar signal using the radar parameter value for the radar system; and, adjusting the receiver portion of the radar system to receive the radar signal having the radar parameter value for the radar system.

In one aspect of the above embodiment, a radar parameter associated with radar parameter value includes a parameter associated with a waveform generated by associated radar unit. In another aspect, the first cluster includes a set of radars having an orientation direction a same orientation direction of the radar system, a second cluster includes a set of radars having a second orientation direction substantially 180° from that of the first cluster, and determining the radar parameter value for the first vehicle further includes determining a second mean value for the radar parameter value associated with the second cluster and adjusting the determined radar parameter value for the radar system to a value sufficient to avoid direct interference with radars associated with the second cluster. In yet another aspect, determining the set of clusters includes using one of a K-nearest neighbor, a Gaussian Mixture algorithm to associate radar orientations for each cluster of the set of clusters, or a range of orientation angles to associate radar orientations for each cluster of the set of clusters.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIGS. 11 and 12 and the discussion thereof describe an exemplary vehicle network architecture and radar architecture, these exemplary architectures are presented merely to provide a useful reference in discussing various aspects of the invention. Of course, the description of the architectures has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of radar system 1200 are circuitry located on a single integrated circuit or within a same device. Alternatively, radar system 1200 may include any number of separate integrated circuits or separate devices interconnected with each other. For example, memory 1245 may be located on a same integrated circuit as DSP 1235 or on a separate integrated circuit or located within another peripheral or slave discretely separate from other elements of system 1200.

Furthermore, those skilled in the art will recognize that boundaries between the functionality of the above-described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software system elements described herein may be received elements of system 1200 or processor 1150, for example, from computer readable media such as memory 1245 or other media on other computer systems. Such computer readable media may be permanently, removably or remotely coupled to an information processing system such as system 1200 or processor 1150. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. For example, different radar parameters can be used to avoid direct interference. Also, different types of radar technology can be used without departing from embodiments of the present invention. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for reducing radar interference at a first radar unit installed on a first vehicle, the method comprising:
   receiving, at a radio frequency (RF) receiver of the first vehicle, from a plurality of vehicles comprising radar units in a vicinity of the vehicle, a radar parameter value associated with each radar unit and information associated with an orientation direction of each radar unit of each vehicle of the plurality of vehicles;
   determining, by a processor coupled to the RF receiver, a set of clusters associated with each radar unit of the plurality of vehicles, wherein each cluster is associated with the orientation direction of the radar units;
   associating, by the processor, the first radar unit with a first cluster of the set of clusters, wherein the association is determined in light of an orientation direction of the first radar unit;
   determining, by the processor, the radar parameter value for the first radar unit, wherein
   said determining the radar parameter value for the first radar unit comprises determining a mean value of the radar parameter value for radar units in the first cluster; and
   adjusting the first radar unit to transmit a radar signal using the determined radar parameter value for the first radar unit.

2. The method of claim 1, wherein a radar parameter associated with the radar parameter value comprises a parameter associated with a waveform generated by an associated radar unit.

3. The method of claim 1, wherein
   the first cluster comprises a set of radars having an orientation direction in a same orientation direction as the first radar unit; and
   a second cluster comprises a set of radars having a second orientation direction substantially 180 degrees from that of the first cluster.

4. The method of claim 3, wherein said determining the radar parameter value for the first radar unit further comprises:
   determining a second mean value of the radar parameter value associated with the second cluster, and
   adjusting the determined radar parameter value for the first radar unit to a value sufficient to avoid direct interference with radar units associated with the second cluster.

5. The method of claim 1, wherein said determining the set of clusters comprises at least one of:
   using one of a K-nearest neighbor or Gaussian Mixture algorithm to associate radar orientations for each cluster of the set of clusters, and
   using a range of orientation angles to associate radar orientations for each cluster of the set of clusters.

6. The method of claim 1, further comprising:
   transmitting, at an RF transmitter of the first vehicle, information associated with the determined radar parameter value of the first radar unit and the orientation direction of the first radar unit.

7. The method of claim 6, further comprising performing said transmitting and said receiving using a side communication network comprising the first vehicle and the plurality of vehicles.

8. A first vehicle comprising:
   a radio frequency (RF) receiver configured to receive signals from a plurality of other vehicles, wherein the signals comprise a radar parameter value associated with radar units associated with each vehicle of the plurality of other vehicles and information associated with an orientation direction of each radar unit of each vehicle of the plurality of other vehicles;
   a radar system configured to transmit a radar signal in a field of view direction associated with a direction of travel of the first vehicle;
   a processor, coupled to the RF receiver and the radar system; and
   a memory, coupled to the processor, and storing instructions executable by the processor for:
      determining a set of clusters associated with each radar unit of the plurality of other vehicles, wherein each cluster is associated with an orientation direction of the radar units,
      associating the radar system with a first cluster of the set of clusters, wherein the association is determined in response to an orientation direction of the radar system,
      determining the radar parameter value for the radar system, wherein
      said determining the radar parameter value for the radar system comprises determining a mean value of the radar parameter value for radars in the first cluster, and adjusting the radar system to transmit the radar signal using the determined radar parameter value for the radar system.

9. The vehicle of claim 8, wherein a radar parameter associated with the radar parameter value comprises a parameter associated with a waveform generated by an associated radar unit.

10. The vehicle of claim 8, wherein
the first cluster comprises a set of radars having an orientation direction in a same orientation direction as the radar system; and
a second cluster comprises a set of radar units having a second orientation direction substantially 180 degrees from that of the first cluster.

11. The vehicle of claim 10, wherein said determining the radar parameter value for the radar system further comprises:
determining a second mean value for the radar parameter value associated with the second cluster, and
adjusting the determined radar parameter value for the radar system to a value sufficient to avoid direct interference with radar units associated with the second cluster.

12. The vehicle of claim 8, wherein said determining the set of clusters comprises:
using one of a K-nearest neighbor or Gaussian Mixture algorithm to associate radar unit orientations for each cluster of the set of clusters.

13. The vehicle of claim 8, wherein said determining the set of clusters comprises:
using a range of orientation angles to associate radar unit orientations for each cluster of the set of clusters.

14. The vehicle of claim 8, further comprising:
an RF transmitter configured to transmit information associated with the determined radar parameter value of the radar system and the orientation direction of the radar system.

15. The vehicle of claim 14, wherein the RF transmitter and RF receiver perform said transmitting and said receiving using a side communication network comprising the first vehicle and the plurality of other vehicles.

16. An apparatus, comprising:
a radio frequency (RF) receiver configured to receive a plurality of RF signals from a plurality of RF transmitters, wherein each RF signal of the plurality of RF signals comprises a radar parameter value associated with a corresponding RF transmitter of the plurality of RF transmitters and information indicative of an orientation direction of the corresponding RF transmitter of the plurality of RF transmitters;
a radar system configured to transmit a radar signal in a field of view direction associated with a movement direction of the apparatus;
a processor, coupled to the RF receiver and the radar system; and
a memory, coupled to the processor, and storing instructions executable by the processor for:
determining a set of clusters associated with the plurality of RF transmitters, wherein each cluster is associated with an orientation direction of at least one RF transmitter in the plurality of RF transmitters,
associating the radar system with a first cluster of the set of clusters, wherein the association is determined in response to an orientation direction of the radar system,
determining the radar parameter value for the radar system based at least in part on radar parameter values associated with RF transmitters in the first cluster.

17. The apparatus of claim 16, wherein determining the radar parameter value for the radar system comprises determining a mean value of the radar parameter values associated with RF transmitters in the first cluster.

18. The apparatus of claim 16, wherein
the first cluster comprises a first subset of RF transmitters in the plurality of RF transmitters having an orientation direction in a same orientation direction as the radar system; and
a second cluster comprises a second subset of RF transmitters in the plurality of RF transmitters having a second orientation direction substantially 180 degrees from the orientation direction associated with the first cluster.

19. The apparatus of claim 18, wherein
said determining the radar parameter value for the radar system further comprises:
determining a second mean value of radar parameter values associated with RF transmitters in the second cluster, and
adjusting the determined radar parameter value for the radar system to reduce direct interference with RF transmitters in the second subset.

20. The apparatus of claim 16, wherein said determining the set of clusters comprises using at least one of (i) a K-nearest neighbor algorithm, (ii) a Gaussian Mixture algorithm, and (iii) a range of orientation angles to associate orientation directions of RF transmitters in the plurality of RF transmitters for each cluster of the set of clusters.

* * * * *